(12) United States Patent
Gierling

(10) Patent No.: US 6,522,965 B1
(45) Date of Patent: Feb. 18, 2003

(54) METHOD FOR SETTING A MULTIPLICATION OF A CONTINUOUSLY VARIABLE AUTOMATIC TRANSMISSION EQUIPPED WITH A VARIATOR

(75) Inventor: Armin Gierling, Langenargen (DE)

(73) Assignee: ZF Freidrichshafen AG, Friedrichshafen (DE)

( * ) Notice: Subject to any disclaimer, the term of this patent is extended or adjusted under 35 U.S.C. 154(b) by 0 days.

(21) Appl. No.: 09/743,586

(22) PCT Filed: Jul. 21, 1999

(86) PCT No.: PCT/EP99/05179

§ 371 (c)(1),
(2), (4) Date: Jan. 11, 2001

(87) PCT Pub. No.: WO00/06412

PCT Pub. Date: Feb. 10, 2000

(30) Foreign Application Priority Data

Jul. 27, 1998 (DE) .......................................... 198 33 699

(51) Int. Cl.⁷ .............................................. B60K 41/28
(52) U.S. Cl. ............................ 701/51; 701/58; 701/67; 477/37; 477/39
(58) Field of Search ............................ 701/51, 54, 58, 701/60, 67, 68; 477/37, 39

(56) References Cited

U.S. PATENT DOCUMENTS

| | | | | |
|---|---|---|---|---|
| 4,648,496 A | * | 3/1987 | Petzold et al. | 192/103 R |
| 4,700,590 A | * | 10/1987 | Omitsu | 477/107 |
| 4,811,225 A | * | 3/1989 | Petzold et al. | 477/39 |
| 5,056,637 A | | 10/1991 | Miyawaki et al. | 192/0.058 |
| 5,095,776 A | * | 3/1992 | Sato | 192/3.31 |
| 5,364,321 A | * | 11/1994 | Togai et al. | 477/42 |
| 5,700,224 A | * | 12/1997 | Suzuki et al. | 477/44 |

FOREIGN PATENT DOCUMENTS

| | | | |
|---|---|---|---|
| DE | 35 09 017 A1 | 10/1985 | |
| DE | 41 20 540 C1 | 11/1992 | |
| DE | 43 01 591 A1 | 7/1993 | |
| DE | 40 42 090 C2 | 10/1994 | |
| DE | 40 42 092 C2 | 10/1994 | |
| DE | 197 11 384 A1 | 11/1997 | |
| GB | 2 263 519 A | 7/1993 | |
| GB | 2312258 A | * 10/1997 | ........... F16H/15/38 |
| WO | 97/46816 | 12/1997 | |

* cited by examiner

Primary Examiner—Michael J. Zanelli
Assistant Examiner—Eric M Gibson
(74) Attorney, Agent, or Firm—Davis & Bujold, P.L.L.C.

(57) ABSTRACT

A method for setting a multiplication of a continuously variable automatic transmission (CVT transmission) comprises the following steps:
a) it is determined in a test module (M1, M1') whether an operating situation is present in which a program module (M2, M2') for adapting an existing transmission multiplication (i_v_ist) to a vehicle speed (v_F) or to an output rotational speed (n_ab) of the transmission is activated; in the negative a transmission specified multiplication (i_v_stratagy, i_v_start) is determined as new transmission specified multiplication (i_v_soll) from a characteristic field for a regular driving strategy;
b) it is tested in the program module (M2, M2') whether the vehicle speed (v_F) or the output rotational speed (n_ab) of the transmission is higher than a predetermined limiting value (v_F_limit, n_ab_limit);
c) in the case of a positive inquiry, a predefined transmission specified multiplication (i_v_ABS, i_start_w) assigned to the determined operating state is set as new transmission specified multiplication (i_v_soll) when the starting clutch is activated; in the case of a negative inquiry, a processing function (F4, F17) is begun in order at least partly open a starting clutch and the transmission specified multiplication (i_v_ABS, i_start_w) assigned to the determined operating state is set as a new transmission specified multiplication (i_v_soll).

22 Claims, 3 Drawing Sheets

METHOD FOR SETTING A MULTIPLICATION OF A CONTINUOUSLY VARIABLE AUTOMATIC TRANSMISSION EQUIPPED WITH A VARIATOR

FIELD OF THE INVENTION

The invention relates to a method for setting a multiplication of a continuously variable automatic transmission (CVT) equipped with a variator for a vehicle having an electronic transmission control (EGS) which has a control unit, with a microcomputer connected with sensors and/or external control units to detect several operating parameters, and with an actuator wherein a starting clutch is actuatable by the actuator.

BACKGROUND OF THE INVENTION

From the practice methods are known for adjusting the multiplication of an automatic transmission in which, on the basis of specific input variables on the electronic transmission control (EGS), such as accelerator pedal position, motor rotational speed, rotational speeds of primary and secondary disks of a variator and the like, the transmission multiplication is set by means of characteristic fields stored in the EGS for a driving strategy under usual operating conditions.

For multi-step automatic transmissions, there are also known from the practice, special programs for particular operating conditions such as a winter driving program manually actuatable by the driver, via a switch, for better starting with low friction values, i.e. a snow-covered or iced road. Hereby is prevented, among other things, shifting in the lowest gear as a starting multiplication.

The known winter driving program, however, cannot be used in automatic transmissions having a variator, since the multiplication range of the transmissions is substantially limited by the mechanical stops of the pushing linked band of the variator with the shortest possible multiplication (LOW) and longest possible multiplication (overdrive, OD). Compared to multi-step automatic transmissions CVT transmissions usually have a larger spread accordingly making shorter starting multiplications possible, which nonetheless are a cause of low starting power and poor starting stability in the presence of low road friction values.

Besides, it has proven problematic in automatic transmissions having a variator that at extreme retardations of the driving speed, such as emergency braking or engagement of an antiblock system (ABS), the setting of the multiplication is so slow that when an acceleration operation immediately follows braking, there is not an optimum multiplication of the transmission.

The starting power when restarting is accordingly weak as a result of a still too low multiplication ratio. In addition, during an extreme retardation of the driving speed, there appear on the drive train high drag torques which impair the driving stability of the vehicle.

Therefore, this invention is based on the problem of making available a method which makes possible a quick adaptation of the multiplication of an automatic transmission with a variator (CVT transmission) to a critical driving situation, mainly in the cases of low road friction values and abrupt decelerations, a strong starting power being ensured, and at the same time the drag torques of the drive train can be reduced whereby, in turn, a high braking stability of the vehicle is ensured.

SUMMARY OF THE INVENTION

With the aid of the inventive method, which can be implemented in a regular driving strategy, a free multiplication adjustment is advantageously possible for setting a multiplication adapted to the need when starting a motor vehicle or when restarting after a strong brake operation.

By opening the starting clutch, the variator is uncoupled from the motor or the output and, in this manner at least, an additional degree of freedom is obtained.

The action of the inventive method is, in particular, dependent on the transmission type, i.e. on whether the starting clutch that conveys the power flow for forward drive is situated in the transmission on the secondary side, hence on the output side, or on the primary side and thus on the motor side.

If the starting clutch is on the secondary side of the variator, the latter is uncoupled from the output and the wheels when the starting clutch is opened.

Thereby the drag torques of the part of the drive train connected with the wheel are advantageously reduced when decelerating, and the variator can be adjusted, independent of the output rotational speed, to a multiplication suitable to an actual vehicle speed, with which it is possible to continue driving after having applied the inventive method.

The use of the inventive method in the arrangement of the forcelocking forward shifting and starting clutches on the secondary side proves especially advantageous when the variator is adjusted while the vehicle is parked. The variator, which runs at the motor rotational speed, can, of course, be easily adjusted when the starting clutch is completely or at least partly open during a stopped adjustment of the variator and when the variator is uncoupled from the wheel rotational speed.

The circumstance described precisely predestines the inventive method, e.g. for a manually selectable winter program with a presetting of the multiplication prior to starting with a low road friction value, whereby the starting power and the starting stability are considerably improved.

The inventive method, however, is also adequate for other applications. It is very advantageous in braking operations with a sharp reduction of the vehicle speed, as in an engagement of an antiblock system (ABS).

It is also possible, by the inventive method, to superimpose a regular driving strategy to improve the driving stability of the vehicle, the variator being separated from the output or wheel by the opening of the starting clutch.

Thus the drag torques of the drive train can be effectively reduced and the variator can correspondingly be freely set to the multiplication suited to the actual vehicle speed or the output rotational speed of the transmission, with such multiplication driving is continued after terminating the program.

The advantages of the inventive method are optimally prevalent in combination with an arrangement of the starting clutch on the secondary side.

However, the inventive method also has advantages when the starting clutch is disposed on the primary side of the variator, e.g. in the above described situation of an ABS engagement.

The variator here remains connected with the output or wheel. The adjustment in the direction of the longest possible multiplication (OD) reduces the slowness of the drive train connected with the wheel. By opening the starting clutch, the variator is uncoupled from the motor whereby the drag torques of the drive train are advantageously further reduced.

In addition, via a function within the electronic motor control, the motor can advantageously be guided to a defined rotational speed in order to ensure the oil supply for a quick variator adjustment. This advantage results from a transmission oil pump operated at the motor rotational speed, since a higher motor rotational speed results in a quicker pressure build up.

The inventive method constitutes a universally useful program module for an automatic transmission, it is particularly adequate for a CVT transmission with a belt drive variator, but it obviously can also be used in automatic transmissions with different types of variators.

BRIEF DESCRIPTION OF THE DRAWINGS

Advantageous embodiments and further developments of the invention will now be described with reference to the drawings in which.

DESCRIPTION OF THE PREFERRED EMBODIMENTS

Figure 1:
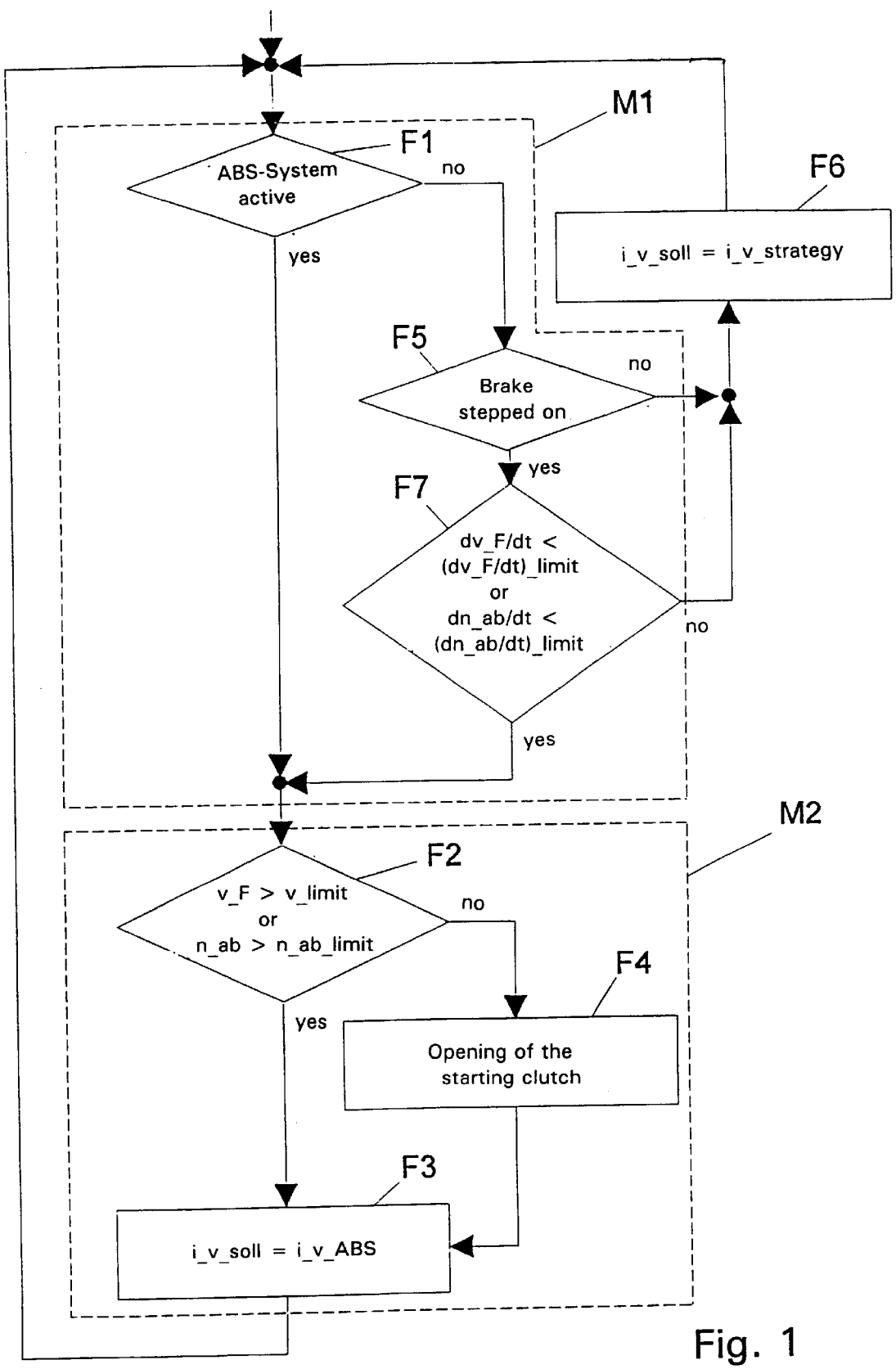
FIG. 1 is a flow chart of a method for setting a multiplication of a CVT transmission with sharp reduction of the vehicle speed.
Figure 2:
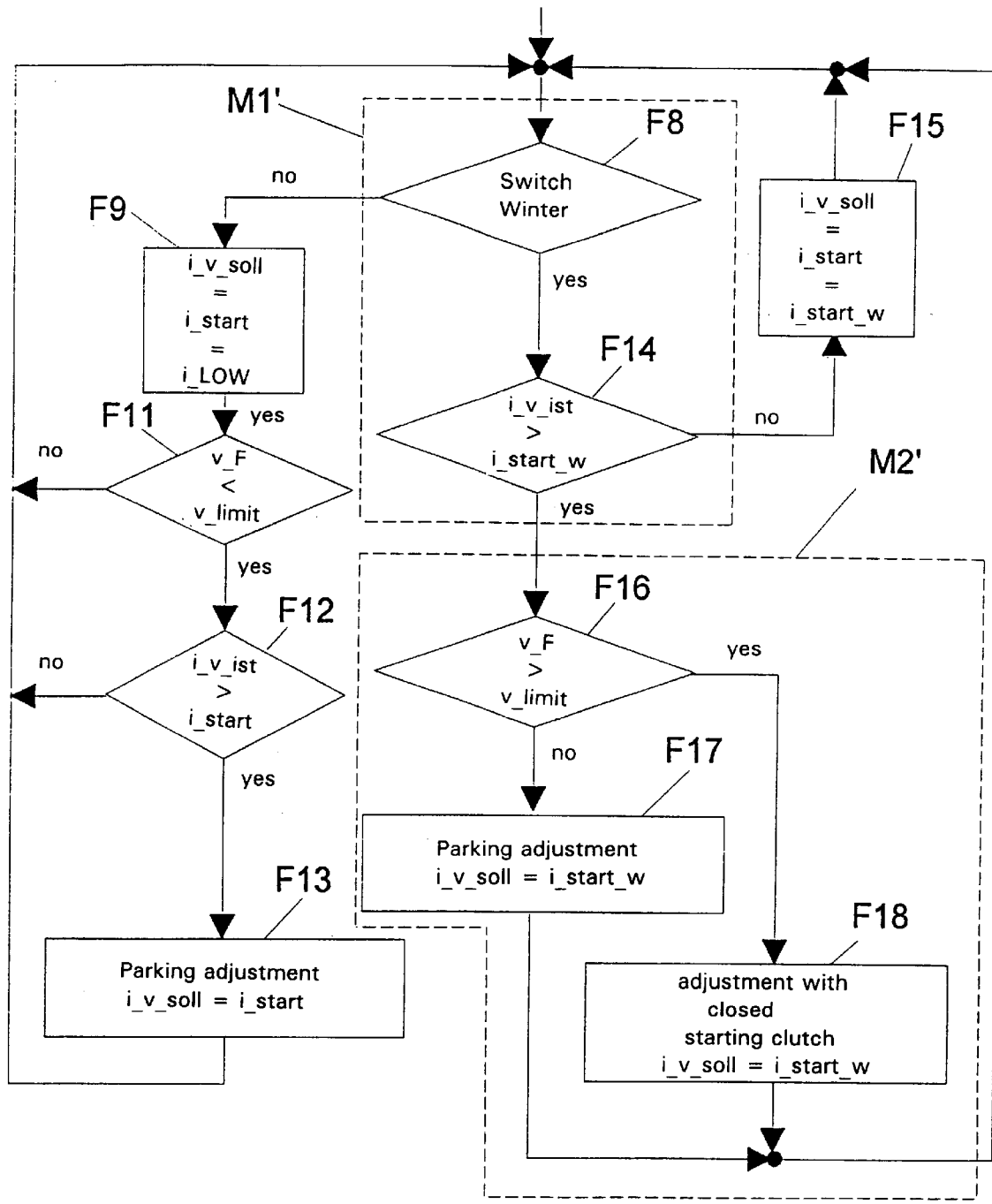
FIG. 2 is a flow chart of a method for setting a multiplication of a CVT transmission with a winter driving strategy wherein a starting multiplication is set.

Referring to FIGS. 1 and 2, in each is shown a flow chart of a method for setting a multiplication of a CVT transmission of a motor vehicle with a starting clutch on the output side.

In a first test module M1, M1', each is determined by comparison of input signals on a control unit of an electronic transmission control with predefined characteristic data, whether a predefined operating situation exists in which a program module M2, M2' for adapting an existing transmission multiplication $i\_v\_ist$ to a vehicle speed $v\_F$ or to an output rotational speed $n\_ab$ of the transmission is activated.

If this is not the case, in a processing function F6, F9 or F15 a transmission specified multiplication $i\_v\_strategy$ or $i\_v$ start is determined from a characteristic field as a new transmission specified multiplication $i\_v\_soll$ for a regular driving strategy.

In the subsequent program module M2, M2' for adapting the transmission specified multiplication $i\_v\_soll$, in a first differentiation function F2 or F16 is tested whether a vehicle speed $v\_F$ or the output rotational speed $n\_ab$ of the transmission is higher than a preset limiting value $v\_F\_limit$ or $n\_ab\_limit$.

If the inquiry of the differentiation function F2 or F16 is positive, with the starting clutch closed, a predefined transmission specified multiplication $i\_v\_ABS$ or $i\_start\_w$ assigned to the detected operation state is set as the new transmission specified multiplication ($i\_v\_soll$).

With a negative inquiry, a processing function F4 or F17 to open the starting clutch is started and to the transmission specified multiplication $i\_v\_ABS$ or $i\_start\_w$ is assigned to the operation state and set as the new transmission specified multiplication $i\_v\_soll$.

In the embodiment of FIG. 1, in the first test module M1 is determined the predefined operating situation for activating the program module M2, provided for adaptation of the transmission specified multiplication, which is a predefined reduction of the vehicle speed $dv\_F/dt$ or of the output rotational speed $dn\_ab/dt$ of the transmission.

As can be seen in FIG. 1, in the first test module M1, first differentiation function F1 tests if a signal "ABS active", i.e. that ABS braking exists, has been issued via a CAN bus to the control unit from the ABS control as an external control unit.

The test module M2 is started if the inquiry is positive.

If the inquiry of differentiation function F1 is negative in test module M1, another differentiation function F5 is started to test whether a brake of the vehicle is actuated.

In the presence of an antiblock system, a gain in time is achieved in ABS braking, since adjustment of the transmission specified multiplication $i\_v\_soll$ has been effected without finishing other test functions and calculations.

However, with differentiation function F5, which in this case is coupled with a brake light or brake pressure switch, a strong deceleration is also detected in the absence of an antiblock system or in the case of a defective ABS control.

To detect a strong braking operation, a sensor can also be provided on the output shaft, such sensor senses braking as a rotational speed reduction and relays it to the control unit.

In case no deceleration has been detected in differentiation function F5, a processing module F6 is started to adapt the transmission specified multiplication $i\_v\_soll$ to a preset, regular transmission multiplication, $i\_v\_strategy$, the test module M1 being restarted after finishing or interruption of the processing module F6.

The preset transmission multiplication $i\_v\_strategy$ corresponds to the transmission multiplication during normal driving operation, which in the electronic transmission control EGS is stored in a characteristic field, and corresponds to the actual vehicle speed or to the input speed.

In differentiation function F5, if a deceleration is detected, a test function F7 is started to determine whether the reduction of the vehicle speed $dv\_F/dt$ or the output rotational speed $dn\_ab/dt$ of the transmission is less than a limiting value $(dv\_F/dt)\_limit$ or $(dn\_ab/dt)\_limit$ stored in a characteristic field, wherein $(dv\_F/dt)\_limit=f(v\_F)$ or $(dn\_ab/dt)\_limit=f(n\_ab)$ applies.

The retardation is calculated in the EGS so that the method can also be used in this way without an ABS system.

In case of a negative inquiry from the test function F7, the processing function F6 is started, to adapt the specified multiplication $i\_v\_soll$ to the preset, regular transmission multiplication $i\_v\_strategy$ and after finishing or interruption of the processing function F6, the test module M1 is activated again.

If the test module F6 delivers a positive inquiry, the test module M2 is started, the method applied in the above described manner.

In differentiation function F2 of the test module M2, if it is actually detected that the vehicle speed $v\_F$ or the output rotational speed $n\_ab$ of the transmission is not higher than the preset limiting value which corresponds to a lower vehicle speed or output rotational speed, a processing function F4 is started to open the starting clutch, and the transmission specified multiplication $i\_v\_soll$, with uncoupled variator, is adjusted in a processing function F3 to a transmission specified multiplication for ABS braking $i\_v\_ABS$.

After setting the transmission specified multiplication for ABS braking or interruption of the processing function F3, the test module M1 is returned to.

In a positive inquiry of the differentiation function F2, i.e. that the vehicle speed v_F or the output rotational speed n_ab of the transmission is higher than the preset limiting value, the processing module F3 is immediately started to set the transmission multiplication i_v_ABS and finished when the starting clutch is closed so that the multiplication of the transmission or of the variator is adjusted when the drive train is closed.

Figure 3:
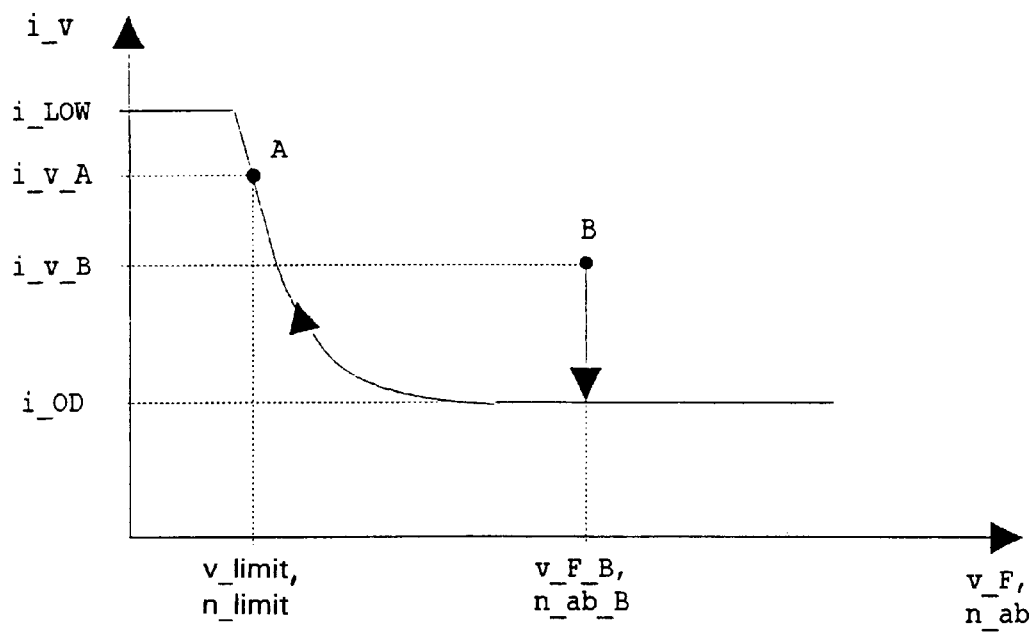
FIG. 3 is a schematized representation of the curve of a multiplication $i\_v$ according to the vehicle speed $v\_F$ or to the output rotational speed $n\_ab$ in a braking operation.

FIG. 3 shows for an ABS deceleration a schematized representation of a qualitative curve of the multiplication i_v according to the vehicle speed v_F or to the output rotational speed n_ab. In an operating point B before the deceleration, first lies a multiplication i_v_B at a vehicle speed v_F_B. Immediately before the deceleration, corresponding to the driver's withdrawal of the acceleration pedal, the multiplication is adjusted while the vehicle rolls in the direction of i_OD, since the least drag torques are present in the drive train with the multiplication when the starting clutch is closed.

During ABS deceleration, the multiplication i_v is adjusted along a predetermined characteristic line up to a vehicle speed v_limit which represents a limiting value at an operating point A with an appertaining multiplication i_v_A. The starting clutch is still closed. When reaching the operating point A, the variator is separated on the output side, i.e. the starting clutch situated on the secondary side of the variator is opened. In this state, the variator that turns at the rotational speed of the motor can be moved to the starting multiplication i_start.

FIG. 2 shows a flow chart of a variant of the method shown in FIG. 1, wherein the predefined operating situation in the first test module M1' to activate the program module M2' represents a start with low road friction value and the activation of a "winter drive strategy".

In the first test module M1', in a first differentiation function F8, it is correspondingly tested whether the control unit has detected if a switch "winter drive strategy" has been activated.

In the instant embodiment, a driver can manually dial the winter drive strategy before the loose driving, via a switch. When this is the case, another differentiation function F14 is activated to determine whether the existing transmission multiplication i_v_ist is higher than a winter drive multiplication i_start_w assigned to the operation state found. In the negative, in the processing function F15 the winter starting multiplication i_start_w is determined as normal starting multiplication i_start.

When the differentiation function F8 delivers the result that the switch "winter drive strategy" is not actuated, there is determined in the processing function F9 as the normal starting multiplication i_start the shortest possible multiplication i_LOW, and in a differentiation function F11 is tested whether the vehicle speed v_F or the output rotational speed n_ab of the transmission is lower than a predetermined limiting value v_limit or n_ab_limit.

If this is proven correct, another differentiation function F12 is started to test whether the existing multiplication i_v_ist is higher than the normal starting multiplication i_start.

When the vehicle speed v_F or the output rotational speed n_ab of the transmission is higher than the limiting value v_limit or n_ab_limit, or when the transmission specified multiplication i_v_ist is lower than the normal starting multiplication i_start, the first test module M1' is returned to.

However, if the existing transmission multiplication i_v_ist is higher than the normal starting multiplication i_start, the normal starting multiplication i_start is set as the transmission specified multiplication i_v_soll before returning to the test module M1'.

The winter starting multiplication i_start_w of the transmission constitutes a discrete value which is between the shortest possible and thus highest multiplication i_LOW and the longest multiplication i_OD of the transmission, i.e. between the mechanical stops of the variator.

It is thus ensured that with low road friction values the lower multiplication i_start_w is started in order, e.g. to prevent a spinning of the wheels on a smooth foundation. The winter drive control is manually dialed by the driver of the vehicle via a switch in the interior of the vehicle.

Figure 4:
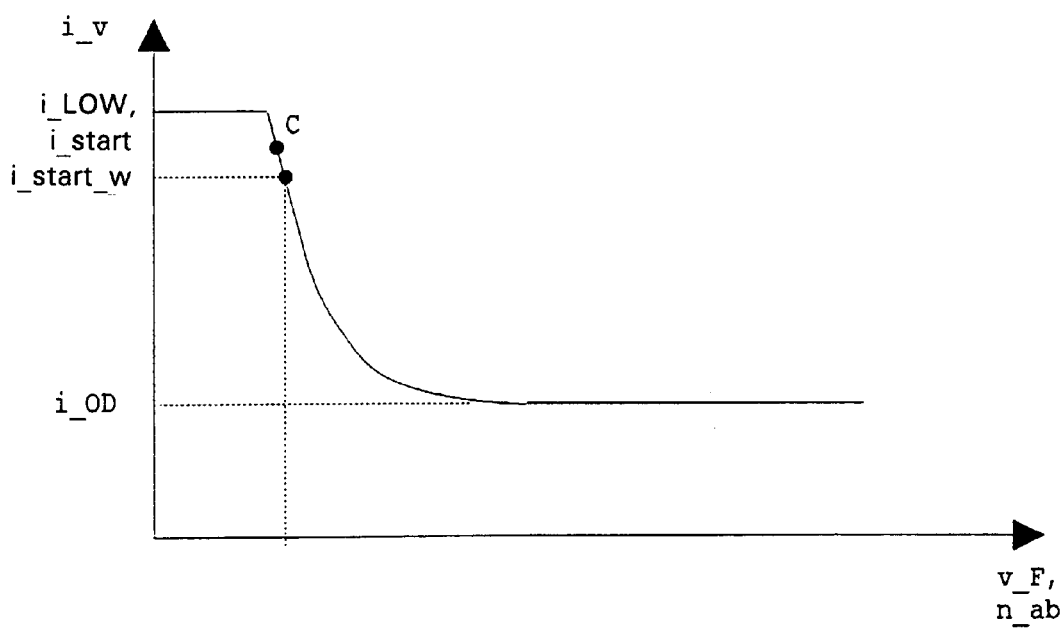
FIG. 4 is a schematized representation of the curve of the multiplication $i\_v$ according to the vehicle speed $v\_F$ or to the output speed $n\_ab$ when using a winter starting control.

FIG. 4 makes clear the action of the method according to FIG. 2 when actuating the switch "winter drive strategy" and shows a schematized representation of the curve of the multiplication i_v according to the vehicle speed v_F or the output rotational speed n_ab.

If the driver activates the winter drive strategy while the vehicle does not moving, the winter drive multiplication i_start_w, latently stored in the electronic transmission control, is set by a parking adjustment of the variator. When the switch "winter drive strategy" is deactivated prior to starting, the variator is, in turn, uncoupled from the output and the normal start multiplication i_LOW is set.

When the switch "winter drive strategy" is activated at an operating point C in which the existing multiplication i_v_C is higher than the winter start multiplication i_start_w, and the vehicle speed is lower than a limiting speed v_limit, the starting clutch is likewise opened and the variator adjusted to the winter start multiplication i_start_w.

In the instant embodiments, the multiplication in the ABS deceleration or the winter drive strategy is freely adjusted in discrete values, but the free multiplications to be set can also be variably formed by the electronic transmission control, e.g. in combination with a fuzzy-logic programming departing from the actual operating parameters.

| Reference designations | |
|---|---|
| F2, F5, F7, F8. F11, F12, F14, F16 | differentiation function |
| F3, F4, F6, F9, F13, F15, F17, F18 | processing function |
| i_start | start multiplication |
| i_start_w | winter start multiplication |
| i_LOW | shortest possible multiplication |
| i_OD | longest possible multiplication, overdrive |
| i_v_ist | multiplication of the transmission |
| i_v_A, i_v_B, i_v_C | multiplication at the A, B, C operating point |
| i_v_ABS | multiplication during an ABS deceleration |
| i_v_soll | transmission specified multiplication |
| i_v_strategy | multiplication of the "normal" or "regular" driving strategy |
| M1, M1', M2, M2' | program module, test module |
| n_ab | output rotational speed of the transmission |
| n_ab_A, n_ab_B, n_ab_C | output rotational speed at the operating point A, B, or C |
| dn_ab/dt | retardation of the output rotational speed |
| (dn_ab/dt)_limit | limiting value of the retardation of the output rotational speed |
| v_F | vehicle speed |
| v_F_A, v_F_B, v_F_C | vehicle speed at the operating point A. B. C |
| V_limit | limiting value of the vehicle speed |
| dv_F/dt | reduction of vehicle speed |
| (dv_F/dt)_limit | limiting value of the retardation of the vehicle speed |

I claim:
1. A method carried out by an electronic transmission control for setting a multiplication of a continuously variable automatic transmission having a variator (CVT transmission) for a motor vehicle having the electronic transmission control, said control having a control unit with a microcomputer connected with one of sensors and external control units to detect several operating parameters and with an actuator wherein a starting clutch is actuatable by the actuator, said method comprising the following steps:
   a) determining in a test module (M1 or M1'), by comparison of a set of input signals in the control unit with a predefined characteristic data, if a predefined operating situation exists in which a program module (M2 or M2') is activated for adaptation of an existing transmission multiplication (i_v_ist) to one of a vehicle speed (v_F) and an output rotational speed (n_ab) of the transmission; and determining in the negative, in a processing function (F6, F9 or F15 respectively), a transmission specified multiplication (i_v_strategy, i_v_start) from a characteristic field as a new transmission specified multiplication (i_v_soll) for a regular driving strategy;
   b) in the program module (M2 or M2') for adaptation of the transmission specified multiplication (i_v_soll), testing in a differentiation function (F2 or F16) if one of the vehicle speed (v_F) and the output rotational speed (n_ab) of the transmission is higher than a predetermined limitation value (v_F_limit, n_ab_limit); and
   c) for a positive inquiry of the differentiation function (F2 or F16), and when the starting clutch is closed, assigning a predefined transmission specified multiplication (i_v_ABS), i_start_w) to a detected operation state and setting the predefined transmission specified multiplication (i_v_ABS), i_start_w) as the new transmission specified multiplication (i_v_soll); in case of negative inquiry a processing function (F4 or F17), starting to at least partly open the starting clutch and assigning to the operating state the predefined transmission specified multiplication (i_v_ABS, i_start_w) and setting the transmission specified multiplication (i_v_ABS, i_start_w) as the new transmission specified multiplication (i_v_soll).

2. The method according to claim 1, further comprising the following step:
   in the first test module (M1) for activating the program module (M2) and for adaptation of the transmission specified multiplication (i_v_soll), determining for the predefined operating situation as one of a predefined reduction of the vehicle speed (dv_F/dt) and the output rotational speed (dn_ab/dt) of the transmission.

3. The method according to claim 2, further comprising the following step:
   in a characteristic field of the transmission control, storing predetermined values of the new transmission specified multiplication (i_v_soll), limiting values of a vehicle speed reduction (((dv_F/dt)_limit)=f(v_F)), and an output rotational speed of the transmission (((dn_ab/d) limit)=f(n_ab)).

4. The method according to claim 1, further comprising the following steps:
   in a first differentiation function (F1) of the first test module (M1), testing whether an ABS control, as external control unit, has issued a signal "ABS active" to the control unit; and when in the affirmative, starting the program module (M2).

5. The method according to claim 1, further comprising the following step:
   in the test module (M1), starting an additional differentiation function (F5) to test whether a brake of the vehicle is actuated.

6. The method according to claim 5, further comprising the following step:
   in case of a negative inquiry of a differentiation function (F1), starting the additional differentiation function (F5).

7. The method according to claim 6, further comprising the following steps:
   in case of negative inquiry of the additional differentiation function (F5), starting the processing function (F6) to adapt the new transmission specified multiplication (i_v_soll) to the transmission spedified multiplication (i_v_strategy); and
   after one of finishing and interrupting of the processing function (F6), activating the test module (M1).

8. The method according to claim 5, further comprising the following step:
   in case of positive inquiry of the additional differentiation function (F5), starting a test function (F7) to determine if one of a vehicle speed reduction (dv_F/dt) and an output rotational speed (dn_ab/dt) of the transmission is lower than a predetermined limiting value (((dv_F/dt_limit, (dn_ab/dt_limit)).

9. The method according to claim 8, further comprising the following steps:
   in case of negative inquiry of the test function (F7), starting the processing function (F6) to adapt the new transmission specified multiplication (i_v_soll) to the transmission specified multiplication (i_v_strategy_); and
   reactivating the test module (M1) after one of finishing and interruption of the processing function (F6).

10. The method according to claim 8, further comprising the following step:
    in case of positive inquiry of the test function (F7), starting the program module (M2).

11. The method according to claim 1, further comprising the following step:
    activating the program module (M2') if the predefined operating situation in the test module (M1') constitutes a start with low road friction value.

12. The method according to claim 11, further comprising the following step:
    in a first differentiation function (F8) in the test module (M1'), testing whether the control unit detects a "winter drive strategy" switch as active.

13. The method according to claim 12, further comprising the following steps:
    in case of a positive inquiry of the first differentiation function (F8), activating a differentiation function (F14) to determine whether the existing transmission multiplication (i_v_ist) is greater than a winter drive multiplication (i_start_w) assigned to the detected operating state; and in the negative, determining the winter start multiplication (i_start_w) as a normal starting multiplication (i_start) in the processing function (F15).

14. The method according to claim 12, further comprising the following steps:

in case of a negative inquiry of the first differentiation function (F8), determining a smallest possible multiplication (i_LOW) as a normal starting multiplication (i_start) in the proceeding function (F9); and in a coordinated differentiation function (F11), testing whether one of the vehicle speed(v_F) and the output rotational speed (n_ab) of the transmission is lower than a predetermined limiting value (v_limit, n_ab_limit).

15. The method according to claim 14, further comprising the following steps:

in an inquiry of the coordinated differentiation function (F11), determining that one of the vehicle speed (v_F) and the output rotational speed (n_ab) of the transmission is lower than the limiting value (v_limit, n_ab_limit); and starting a differentiation function (F12) to test whether the existing multiplication (i_v_ist) is higher than the normal starting multiplication (i_start).

16. The method according to claim 15, further comprising the following step:

before returning to the test module (M1') and in case the existing transmission specified multiplication (i_v_ist) is higher than the normal starting multiplication (i_start), setting the normal starting multiplication (i_start) as transmission specified multiplication (i_v_soll).

17. The method according to claim 14, further comprising the following step:

in case one of the vehicle speed (v_F) and the output rotational speed (n_ab) of the transmission is higher than one of the limiting value (v_limit, n_ab_limit) and the transmission multiplication (i_v_ist) is lower than the normal starting multiplication (i_start), returning to the first test module (M1').

18. The method according to claim 11, further comprising the following step:

storing the predetermined transmission specified multiplication (i_v_ABS, i_start_w) in the electronic transmission control as a discrete variable.

19. The method according to claim 11, further comprising the following step:

in a first differentiation function (F8) in the first test module (M1'), testing whether the control unit has detected a "winter" driving state by an evaluation of driving state variables.

20. The method according to claim 19, further comprising the following step:

disposing the starting clutch on a secondary side of the variator.

21. The method according to claim 1, further comprising the following step:

determining that a winter start multiplication (i_start_w) of the transmission is between a shortest possible multiplication (i_LOW) and a longest possible multiplication (overdrive, i_OD) of the transmission.

22. The method according to claim 1, further comprising the following step:

storing the predefined transmission specified multiplication (i_v_ABS, i_start_w in the electronic transmission control as a discrete variable.

* * * * *